US005391119A

United States Patent [19]
Kondo et al.

[11] Patent Number: 5,391,119
[45] Date of Patent: Feb. 21, 1995

[54] AUTO TENSIONER

[75] Inventors: Tadashi Kondo; Masahide Ogawa, both of Fujisawa; Hiroyuki Sawai, Kamakura; Takashi Yoshikai, Yokohama; Toshiki Watanabe, Kamakura, all of Japan

[73] Assignee: NSK Ltd., Tokyo, Japan

[21] Appl. No.: 91,270

[22] Filed: Jul. 13, 1993

[30] Foreign Application Priority Data

Jul. 14, 1992 [JP]  Japan ............................. 4-054949[U]

[51] Int. Cl.6 ............................................. F16H 7/08
[52] U.S. Cl. ................................................. 474/112
[58] Field of Search ..................... 474/101, 109–117, 474/133–135

[56] References Cited

U.S. PATENT DOCUMENTS

| 4,832,665 | 5/1989 | Kadota et al. ............. 474/112 |
| 4,838,839 | 6/1989 | Watanabe et al. . |
| 4,934,987 | 6/1990 | Kadota et al. ............. 474/112 |

Primary Examiner—Michael Powell Buiz
Attorney, Agent, or Firm—Helfgott & Karas

[57] ABSTRACT

A pivotal member 2a comprises a main member 19 having inner and outer peripheral faces formed axially symmetric, an auxiliary member 20 having an inner peripheral face 23 made eccentric with respect to an outer peripheral face 24, such that the main member 19 is pivotally supported on the outer peripheral face of a fixed shaft 1, and a tension pulley 5 supported so as to be freely rotatable, on the outer peripheral face of the auxiliary member 20, thereby simplifying manufacturing operations for a pivotal member 2a of an auto tensioner to reduce the manufactured cost.

3 Claims, 6 Drawing Sheets

AUTO TENSIONER

BACKGROUND OF THE INVENTION

1. Field of the Invention

The present invention relates to an auto tensioner such as that used to maintain an appropriate tension in various types of belts such as a timing belt of an automotive engine.

2. Description of the Prior Art

Mechanisms involving a belt drive are widely used for driving the cam shaft of an OHC, or DOHC engine synchronously with the crank shaft. With these mechanisms an appropriate tension is obtained in the belt by resiliently urging a tension pulley against the belt.

Figure 11:
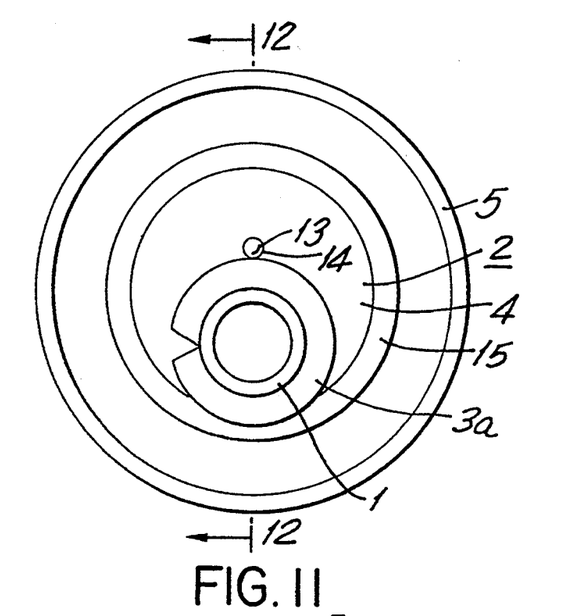
FIG. 11 is a front elevational view showing an example of a conventional construction.
Figure 12:
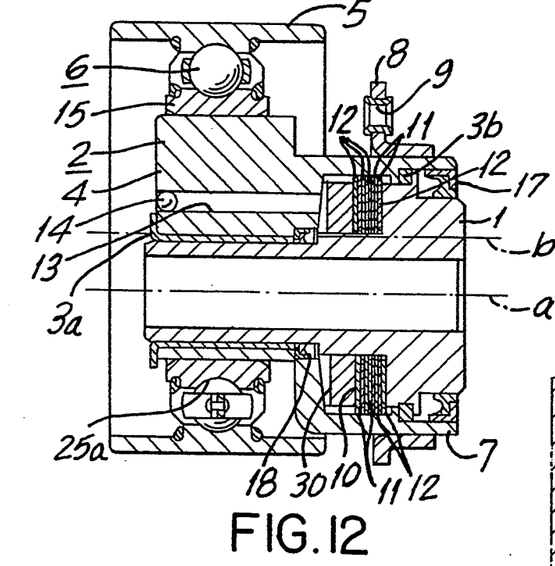
FIG. 12 is a cross sectional view taken along the line XII—XII of FIG. 11.

Conventional well-known auto-tensioners such as the one disclosed in Japanese Patent First Publication KOKAI No.63-180759 utilize the resilient force of a spring to urge the tension pulley resiliently against the belt. A typical example of the construction of such an auto-tensioner is shown in FIGS. 11 and 12.

With this construction, a fixed shaft 1 having a central axis "a" is fixedly attached for example to the front face of an engine block. A pivotal member 2 having a front or forward portion 4 (left side portion in FIG. 12) and a rear or root portion 7 (right side portion in FIG. 12) is supported on the peripheral face of the fixed shaft 1 by means of sliding bearings 3a and 3b so as to be freely pivotal thereabout. The front portion 4 which has a central axis "b" displaced with respect to the central axis "a" of the fixed shaft 1, supports a tension pulley 5 on an outer peripheral face thereof by means of a rolling bearing 6 so as to be freely rotatable thereabout. A bracket 8 having a rim in which is formed an engaging member 9, is fixedly disposed on the peripheral face of the rear portion 7 of the pivotal member 2. By engaging the end of a tension spring (not shown in the figure) to the engaging member 9, a resilient force can be applied to the pivotal member 2 in a direction of rotation of the pivotal member 2 about the fixed shaft 1. As a result, the outer peripheral face of the tension pulley 5 can be resiliently urged towards the belt.

A multi-plate damper mechanism is provided between the fixed shaft 1 and the pivotal member 2 so that even with small fluctuations of the belt, these movements are not followed immediately by the tension pulley 5. Hence vibration of the belt can be effectively damped. The multi-plate damper mechanism comprises a plurality of fixed side plates 11 and movable side plates 12 arranged alternately within a space 10 provided between the outer periphery of the fixed shaft 1 and the inner periphery of the pivotal member 2 and closed by seals 17 and 18 located at axially opposite ends thereof. The inner peripheral rims of the fixed plates 11 are supported on the fixed shaft 1 so as to be rotationally fixed relative thereto, while the outer peripheral rims of the movable plates 12 are supported on the inner peripheral face of the pivotal member 2 so as to be rotationally fixed relative thereto. A retaining plate 30 is fixedly disposed on a peripheral portion of the fixed shaft 1 so as to maintain the spacing between the fixed side plates 11 and the movable side plate 12. The space 10 accommodating the fixed and movable side plates 11 and 12 is filled with a viscous liquid such as oil through a filling hole 13, which is closed after filling by means of a ball 4.

The side faces of the multiple fixed and movable side plates 11 and 12 are separated by a very small gap which is filled by the viscous fluid. Hence any sudden relative fluctuations between the plates 11 and 12 are damped by the resultant shear forces in the viscous fluid so that even with a local sudden increase in belt tension this is not immediately followed by the tension pulley 5. Accordingly, the tension pulley 5 is held against the belt even when the belt is vibrating, thereby damping growth of the vibration.

Figure 13:
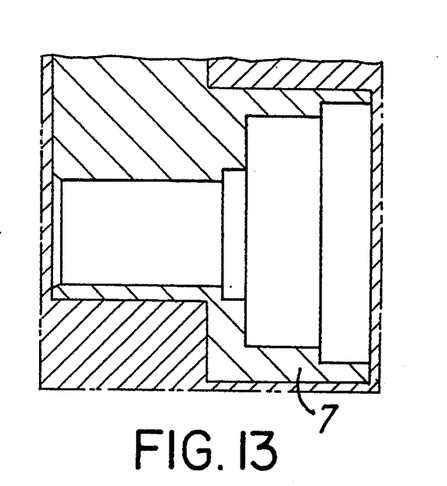
FIG. 13 is a cross sectional view showing a pivotal member blank in a process step according to a conventional construction.

With the pivotal member 2 of the conventional auto tensioner, the outer diametric dimension of the front portion 4 must be accurately finished to provide a press fit into the inner raceway 15 of the bearing 6, and the outer diametric dimension of the rear portion 7 must be accurately finished to provide a press fit into the bracket 8. Consequently, when manufacturing the pivotal member 2, a blank 16 having outer diametric dimensions larger than those of the finished pivotal member 2, as shown by the chain line in FIG. 13 is produced by forging. The hatched portions shown in FIG. 13 are then removed by machining to give an accurate finish to the outer diametric dimensions of the front portion 4 and the rear portion 7 in the pivotal member 2.

As well as proving difficult and time consuming, the machining process for making the front and rear portions 4 and 7 eccentric with respect to each other involves intermittent cutting which results in excessive abrasion of the cutting tool used. Thus manufacturing cost for the pivotal member 2 are high so that the auto tensioner incorporating the pivotal member 2 is also expensive.

SUMMARY OF THE INVENTION

In view of the foregoing, it is an object of the present invention to provide an auto tensioner whereby manufacturing costs can be reduced through simplifying manufacturing of the pivotal member of the auto tensioner.

An auto tensioner of the present invention in one feature comprises a fixed shaft having a first central axis, a pivotal member supported on a peripheral face of the fixed shaft so as to be freely rotatable thereabout, a bearing provided on an outer peripheral face of the pivotal member and having a second central axis parallel to the first central axis, a tension pulley rotatably supported on the bearing, and a spring means provided so as to urge the tension pulley, wherein the pivotal member comprises a main member rotatably supported on the peripheral face of the fixed shaft, and an auxiliary member fixedly fitted onto a portion of the main member, the main member having both inner and outer peripheral faces thereof formed axially symmetric with reference to a third central axis coinciding with the first central axis, and the auxiliary member having an inner peripheral face with a central axis thereof coinciding with the first and third central axes and an outer peripheral face with a central axis thereof coinciding with the second central axis, and the bearing is provided on the outer peripheral face of the auxiliary member.

An auto tensioner of the present invention is another feature comprises a fixed shaft having a first central axis, a pivotal member supported on a peripheral face of the fixed shaft so as to be freely rotatable thereabout, a bearing provided on an outer peripheral face of the pivotal member and having a second central axis parallel to the first central axis, a tension pulley rotatably supported on the bearing, and a spring means provided so as to urge the tension pulley wherein the pivotal member is a precision casting.

DETAILED DESCRIPTION OF THE PREFERRED EMBODIMENTS

In the present invention, an auto tensioner, as with the conventional auto tensioner, basically comprises a fixed shaft having a first central axis, a pivotal member supported on a peripheral face of the fixed shaft so as to be freely pivotal thereabout, a bearing provided on an outer peripheral face of the pivotal member and having a second central axis parallel to the first central axis, a tension pulley rotatably supported on the bearing, and a spring means provided between the pivotal member and a fixed member so as to urge the tension pulley towards a member to be tensioned.

According to a first aspect of the present invention, the pivotal member comprises a main member rotatably supported on the peripheral face of the fixed shaft, and an auxiliary member fixedly disposed on a peripheral portion of the main member. The main member has both inner and outer peripheral faces thereof formed axially symmetric, with a third central axis coinciding with the first central axis. Moreover, the auxiliary member has an inner peripheral face with a central axis thereof coinciding with the first and third central axes, and an outer peripheral face with a central axis thereof coinciding with the second central axis. Furthermore, the before-mentioned bearing is provided on the outer peripheral face of the auxiliary member.

According to a second aspect of the present invention there is provided an auto tensioner wherein the pivotal member is formed as a precision casting.

With the auto tensioners according to the present invention constructed as above, the conditions involved in applying an appropriate tension force to a belt are similar to those of the conventional auto tensioner.

Particularly with the auto tensioner according to the first aspect, since the pivotal member is constructed as an assembly of a main member and an auxiliary member, the difficult machining process involved in the manufacture of the conventional pivotal member is no longer necessary so that the cost for the pivotal member and for the auto tensioner incorporating the pivotal member can be reduced.

In the case of the auto tensioner according to the second aspect, finishing of the surface of the precision casting for the pivotal member is not required, or is only required to a very small extent compared to the conventional case involving machining of the forged blank. As a result, the cost for the pivotal member, and for the auto tensioner incorporating the pivotal member may be reduced.

Other features and objects of the present invention will become apparent from the following description taken with reference to the accompanying drawings.

Figure 1:
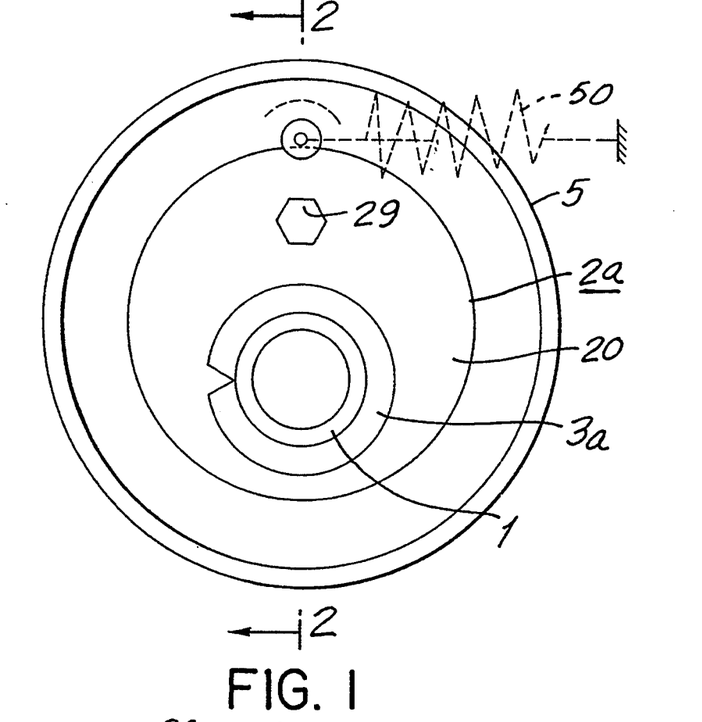
FIG. 1 is a front elevational view of an auto tensioner in accordance with a first embodiment of the present invention.
Figure 2:
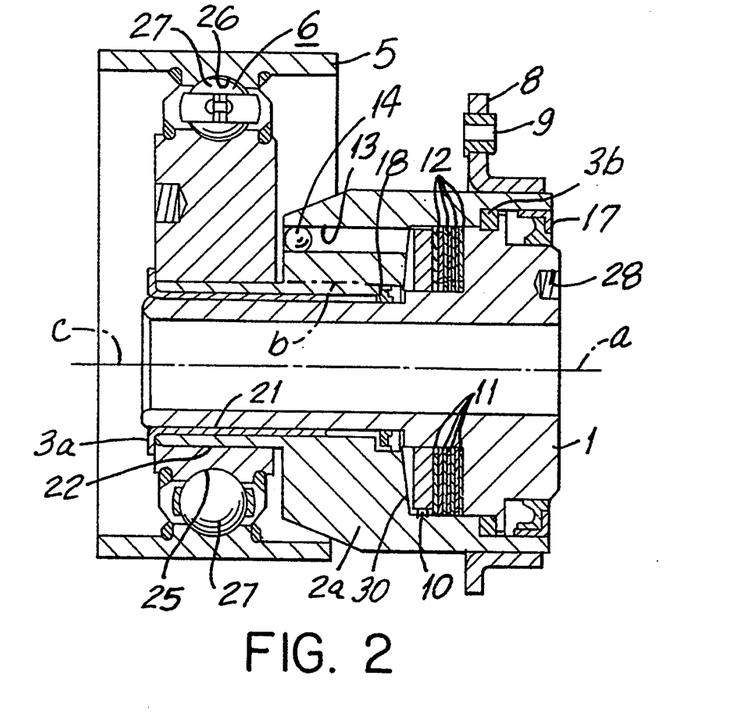
FIG. 2 is a cross sectional view taken along the line II—II of FIG. 1.

FIGS. 1 and 2 show a first embodiment of the auto tensioner according to the present invention corresponding to the first aspect. A feature of the auto tensioner of this embodiment is that a pivotal member 2a is made up of a main member 19 and an auxiliary member 20. Other details of the operation and construction are similar to those of the beforementioned conventional auto tensioner and hence similar components are identified with the same symbols and description is omitted.

The pivotal member 2a comprises the main member 19 rotatably supported on the peripheral face of the fixed shaft 1 by means of the sliding bearings 3a and 3b, and the auxiliary member 20 fixedly disposed on the peripheral face of the front portion (left portion in FIG. 2) of the main member 19. The inner peripheral face 21 and outer peripheral face 22 of the main member 19 are of axially symmetric shape with the third central axis "c" of both peripheral faces 21 and 22 coinciding with the first central axis "a" of the fixed shaft 1.

With the auxiliary member 20, the central axis of inner peripheral face 23 coincides with first and third central axes "a" and "c", and the central axis of outer peripheral face 24 is displaced with respect to the first and third central axes "a" and "c", and coincides with the second central axis "b" of the rolling bearing 6 which rotatably supports the tension pulley 5. In other words, the outer peripheral face 24 is eccentric with reference to the inner peripheral face 23 in the auxiliary member 20, and the rolling bearing 6 is disposed on the outer peripheral face 24 with the second axis "b" as its central axis.

The rolling bearing on the outer peripheral face of the auxiliary member 20 is provided by forming an inner raceway 25 on the outer peripheral face 24 of the auxiliary member 20, and an outer raceway 26 on the inner peripheral face of the tension pulley 5, and providing a plurality of balls 27 between the inner and outer raceways 25 and 26. By means of this rolling bearing the tension pulley 5 is thus able to be rotatably supported on the peripheral face of the auxiliary member 20 about the second central axis "b". A spring 50 is provided to urge the tension pulley 5.

In FIGS. 1 and 2, the cylindrical recess 28 formed in the rear end face of the fixed shaft 1 is used for engagement with a locating pin protruding from the front end of a cylinder block (not shown) to prevent rotation of the fixed shaft 1, while the hexagonal recess 29 formed on the front end face of the auxiliary member 20 is used for engagement with a hexagonal wrench (not shown) when the belt (not shown) is being fitted across the tension pulley 5. The cylindrical recess 28 and hexagonal recess 29 are also provided in the conventional auto tensioner and hence further explanation is omitted.

With the auto tensioner of the present invention constructed as described above, since the pivotal member 2a is constructed as an assembly of the main member 19 and the auxiliary member 20, the difficult machining process involved in the manufacture of the conventional pivotal member 2 is no longer necessary so that the cost for the pivotal member 2a and for the auto tensioner incorporating the pivotal member can be reduced.

Since the inner peripheral face 21 and outer peripheral 22 of the main member 19 are concentric with each other, a standard type lathe can be used in a generally continuous machining operation to finish the peripheral faces 21 and 22 to accurate dimensions. Moreover, the finishing of the outer peripheral face 24 of the auxiliary member 20 to accurate dimensions, and the formation of the inner race 25 in the outer peripheral face 24 may also be achieved using a standard lathe operating in a generally continuous operation. The finishing of the inner peripheral face 23 of the auxiliary member 20 to accurate dimensions may be easily achieved by drilling a cylindrical aperture in a portion of the auxiliary member 20 using a standard drilling machine.

Figure 3:
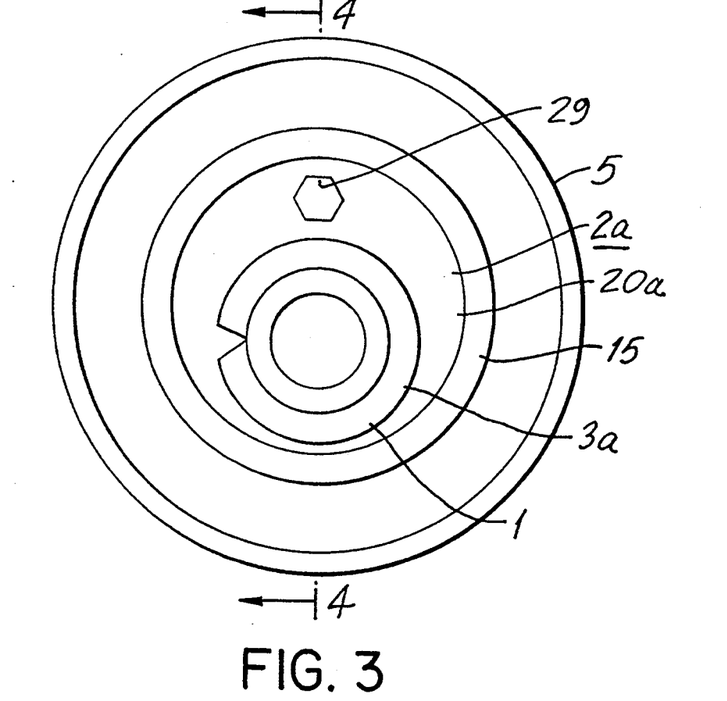
FIG. 3 is a front elevational view of an auto tensioner in accordance with a second embodiment of the present invention.
Figure 4:
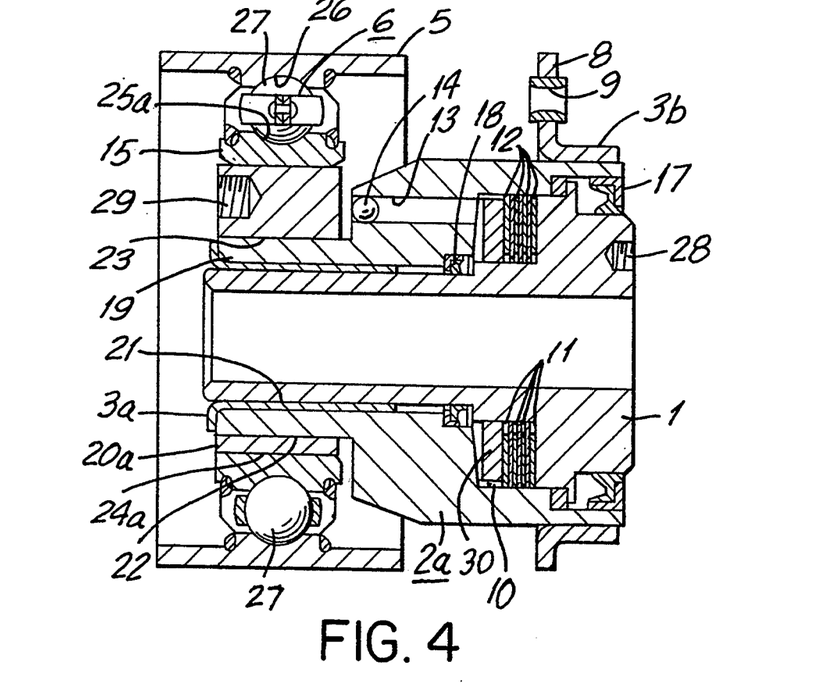
FIG. 4 is a cross sectional view taken along the line IV—IV of FIG. 3.

FIGS. 3 and 4 show a second embodiment of the auto tensioner according to the present invention corresponding to the first aspect. In this embodiment, the rolling bearing is provided on the outer peripheral face 24a of the auxiliary member 20a. This is made by fixedly disposing in a fitting relationship on the outer peripheral face 24a an inner ring 15 having an inner raceway 25a formed on an outer peripheral face thereof. This structure is in contrast to the first embodiment wherein the inner raceway 25 is formed directly on the outer peripheral face 24 of the auxiliary member 20. Other details of construction and operation of the second embodiment are the same as for the first embodiment.

Figure 5:
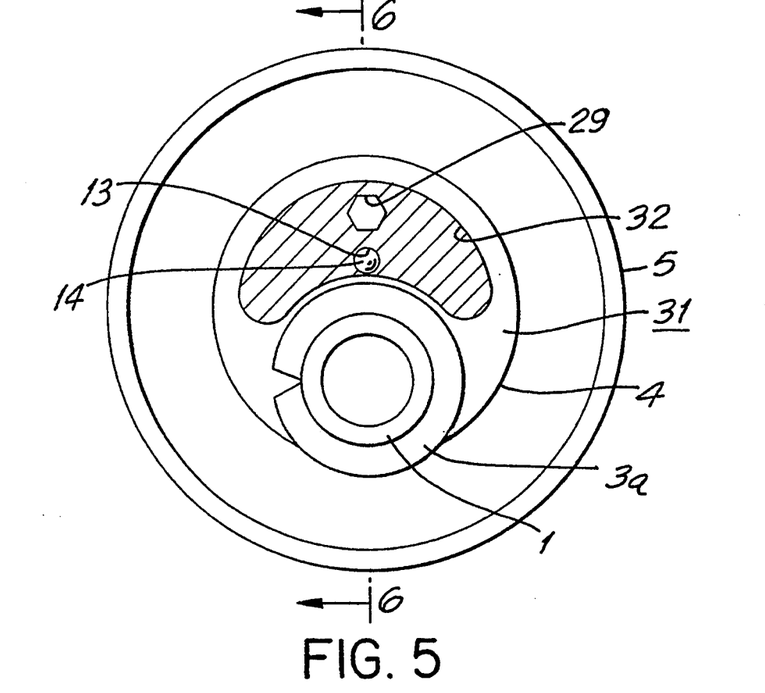
FIG. 5 is front elevational view of an auto tensioner in accordance with a third embodiment of the present invention.
Figure 6:
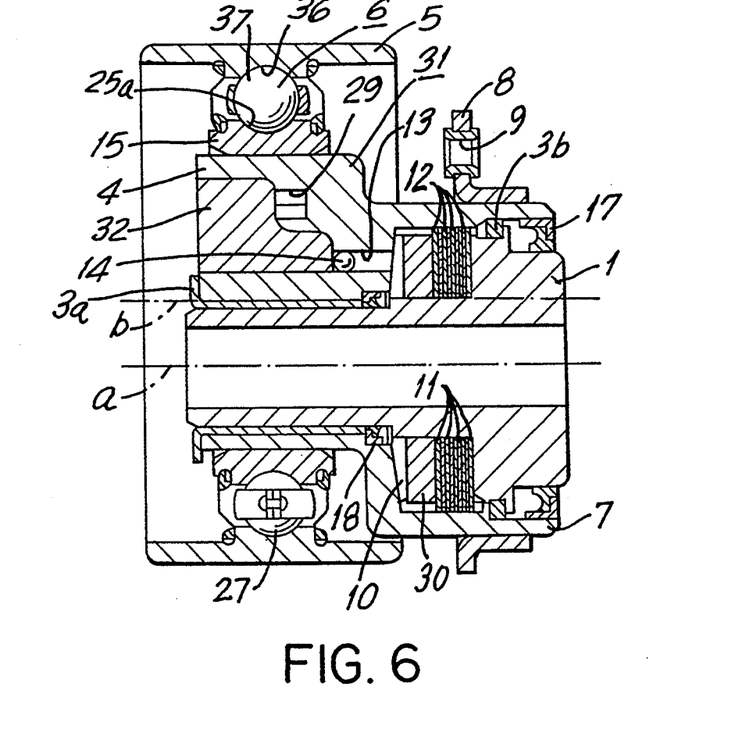
FIG. 6 is a cross sectional view along the line VI—VI of FIG. 5.
Figure 7:
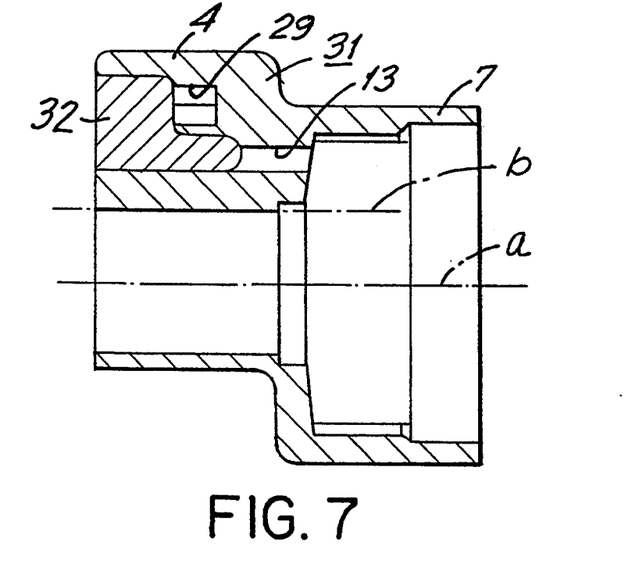
FIG. 7 is a cross sectional view similar to that of FIG. 6 showing the pivotal member only.

FIGS. 5 to 7 show a third embodiment of the auto tensioner according to the present invention corresponding to the second aspect. As with the beforementioned conventional construction, a pivotal member 31 having a front portion 4 and a rear portion 7 is supported on the peripheral face of the fixed shaft 1 by means of sliding bearings 3a and 3b so as to be freely pivotal thereabout. The front portion 4 which has a central axis "b" displaced with respect to the central axis "a" of the fixed shaft 1, supports a tension pulley 5 on an outer peripheral face thereof by means of a rolling bearing 6 so as to freely rotatable thereabout. A bracket 8 having a rim in which is formed an engaging member 9, is fixedly disposed on the peripheral face of the rear portion 7 of the pivotal member 31. By engaging the end of a tension spring (not shown in the figure) to the engaging member 9 a resilient force can be applied to the pivotal member 31 in a direction of rotation of the pivotal member 31 about the fixed shaft 1.

With this embodiment the pivotal member 31 making up the auto tensioner is cast in an integral form by a precision casting method such as a lost-wax process using a metal material such as iron or aluminum alloy. Furthermore, an open or hollow portion 32 (indicated by the cross-hatching in FIGS. 5 to 7) is provided in the front portion 4 opening towards the front face of the front portion 4, so that the weight and material content of the pivotal member 31 can be reduced. The viscous fluid filling port 13, and the hexagonal wrench recess 29 are formed in the interior surface of the open or hollow portion 32.

With the precision casting process, the outer diametric dimensions of the pivotal member 31 may be made so that the pivotal member 31 is finished to the predetermined dimensions at the time of casting, thereby enabling it to be used in the as cast condition. Alternatively, a blank having dimensions slightly larger than the predetermined dimensions may be cast, and the outer diametric faces subsequently machined to form a pivotal member 31 having the predetermined dimensions. Even in the case of machining after casting, since the amount of machining is minimal, process time and labor may be reduced compared to the conventional construction. A reduction in manufacturing cost for the pivotal member 31 formed with the above described open portion 32, and costs for the auto tensioner incorporating the pivotal member 31 may thus be realized. Since other details of construction and operation for this embodiment are the same as for the beforementioned embodiments similar components are denoted by the same numerals and description is omitted.

Figure 8:
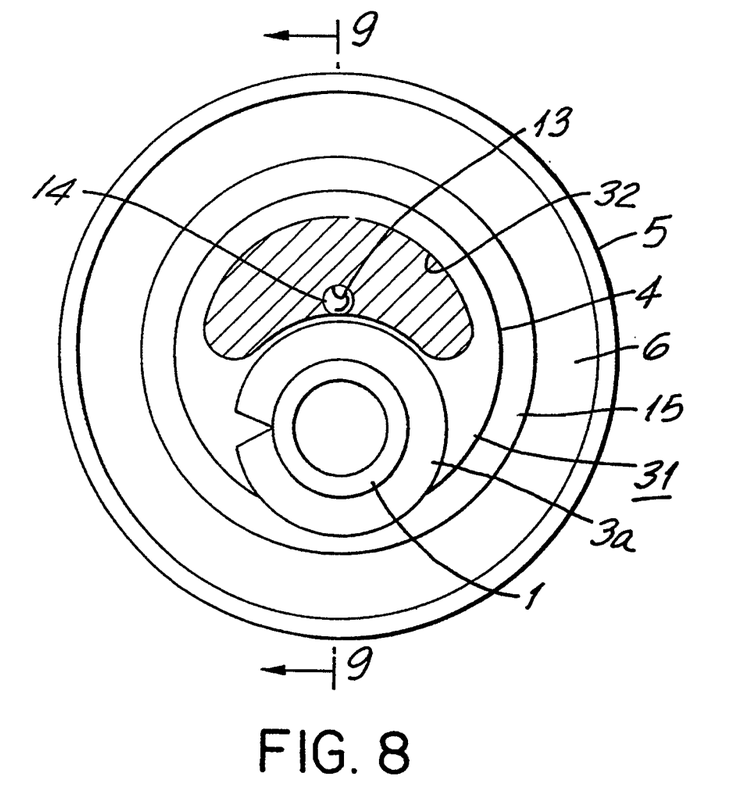
FIG. 8 is a front elevational view of an auto tensioner in accordance with a fourth embodiment of the present invention.
Figure 9:
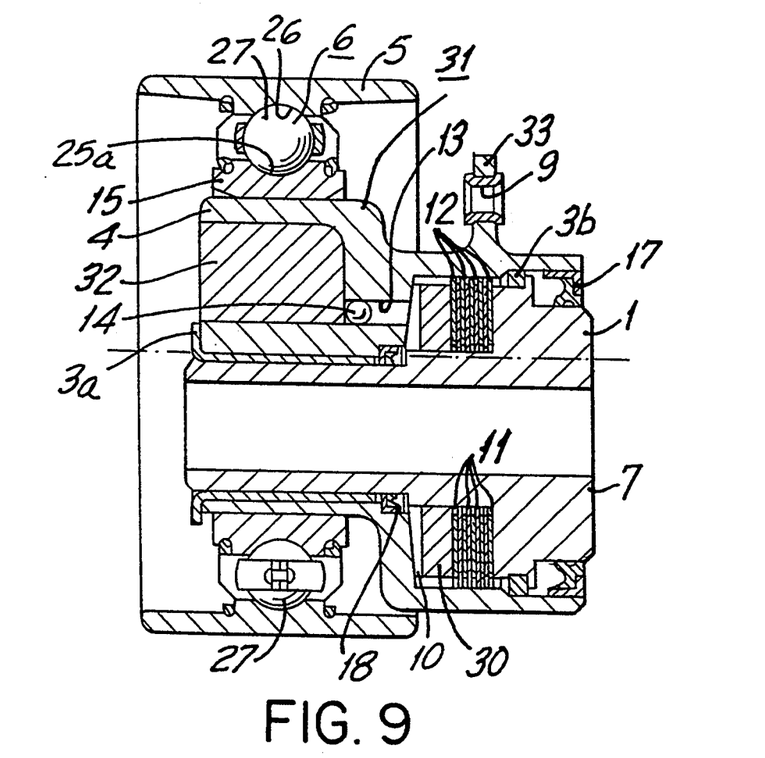
FIG. 9 is a cross sectional view taken along the line IX—IX of FIG. 8.
Figure 10:
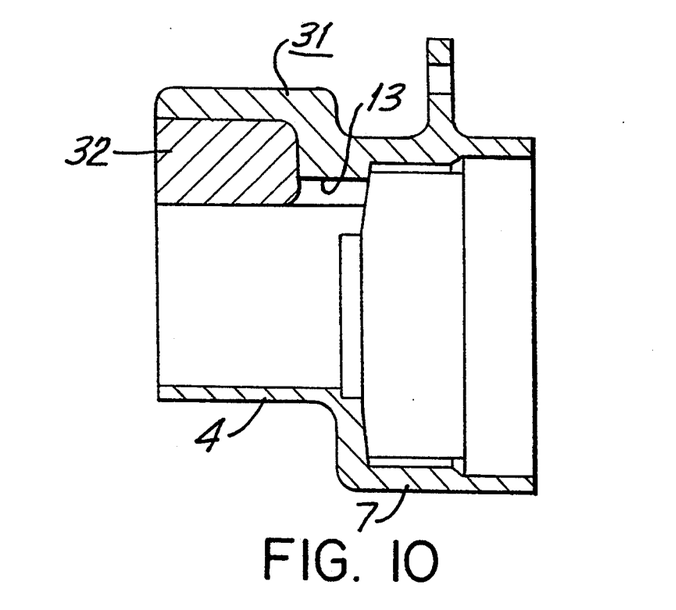
FIG. 10 is a cross sectional view similar to that of FIG. 9 showing the pivotal member only.

FIGS. 8 to 10 show a fourth embodiment of the auto tensioner according to the present invention corresponding to the second aspect. With this embodiment, the bracket 8 in the foregoing embodiments for the engaging member 9 used to connect an end of a tension spring to the pivotal member 31 is omitted, and in its place a lug 33 formed integral with the pivotal member 31 at the time of casting is provided on an outer peripheral portion of the rear member 7 of the pivotal member 31, with the engaging member 9 provided thereon.

Through this integral forming of the lug 33, not only can the time and costs involved with the fitting of the bracket 8 onto the pivotal member 31 be avoided, but the following result is also obtained. That is to say, when fixedly attaching the bracket 8 onto the pivotal member 31 in the previous embodiments, a portion of the pivotal member 31 can be compressed and deformed in the case of a press fit, making it difficult to set the clearance for the sliding bearing 3b which supports the pivotal member 31 on the fixed shaft 1. By forming the lug 33 integral with the pivotal member 31 according to this embodiment, compression of the portion of the pivotal member 31 is avoided since the bracket 8 is omitted. Hence setting of the clearance for the sliding bearing 3b is simplified. Other construction and operation for this embodiment is the same as for the third embodiment.

The auto tensioners of the present invention, are characterized in that the pivotal member 2a comprises a main member 19 and an auxiliary member 20 (20a), or alternatively the pivotal member 31 is made by a precision casting process. The damper mechanism between the fixed shaft 1 and pivotal member 2a, 31 may or may not be provided as required or desired.

The auto tensioner of the present invention constructed and operated as described above, enables a reduction in manufacturing costs due to simplification of the manufacturing process.

What is claimed is:

1. An auto tensioner comprising a fixed shaft having a first central axis and an outer peripheral surface, a pivotal member having an outer peripheral surface and supported on said outer peripheral face of said fixed shaft so as to be freely rotatable thereabout, a bearing provided on said outer peripheral face of said pivotal member and having a second central axis parallel to said first central axis, a tension pulley rotatably supported on said bearing, and a spring means provided so as to urge said tension pulley, said pivotal member comprising a main member rotatably supported on said outer peripheral face of said fixed shaft, and an auxiliary member fixedly fitted onto a portion of said main member, said main member having both inner and outer peripheral faces thereof formed axially symmetric with reference to said first central axis, said auxiliary member having an inner peripheral face with a central axis thereof coinciding with said first central axis and an outer peripheral face with a central axis thereof coinciding with said second central axis, and said bearing being provided on said outer peripheral face of said auxiliary member.

2. An auto tensioner as claimed in claim 1, wherein said bearing having an inner ring formed integral with said outer peripheral face of said auxiliary member.

3. An auto tensioner as claimed in claim 1, wherein said bearing having an inner ring fixedly disposed on said outer peripheral face of said auxiliary member.

* * * * *